(12) United States Patent
Hu et al.

(10) Patent No.: US 11,448,852 B2
(45) Date of Patent: Sep. 20, 2022

(54) OPTICAL ELEMENT DRIVING MECHANISM

(71) Applicant: TDK TAIWAN CORP., Taoyuan (TW)

(72) Inventors: Chao-Chang Hu, Taoyuan (TW);
Liang-Ting Ho, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 165 days.

(21) Appl. No.: 16/800,277

(22) Filed: Feb. 25, 2020

(65) Prior Publication Data
US 2020/0271947 A1 Aug. 27, 2020

Related U.S. Application Data

(60) Provisional application No. 62/809,891, filed on Feb. 25, 2019.

(30) Foreign Application Priority Data

Feb. 3, 2020 (CN) .......................... 202020150553.6

(51) Int. Cl.
*G02B 7/04* (2021.01)
*G02B 27/64* (2006.01)
*G03B 5/02* (2021.01)
*H02K 41/035* (2006.01)
*G03B 3/10* (2021.01)

(52) U.S. Cl.
CPC ............. *G02B 7/04* (2013.01); *G02B 27/646* (2013.01); *G03B 3/10* (2013.01); *G03B 5/02* (2013.01); *H02K 41/0356* (2013.01); *G03B 2205/0015* (2013.01); *G03B 2205/0069* (2013.01)

(58) Field of Classification Search
CPC ........ G02B 7/04; G02B 27/646; G02B 7/102; G03B 3/10; G03B 5/02; G03B 2205/0069; G03B 2205/0015; H02K 41/0356
See application file for complete search history.

(56) References Cited

U.S. PATENT DOCUMENTS 11,181,715 B2* 11/2021 Kinouchi ................. G03B 3/10
2012/0188435 A1* 7/2012 Fan ...................... G02B 13/009
348/340

(Continued)

FOREIGN PATENT DOCUMENTS

CN 107688245 A * 2/2018 ............... G02B 7/09

OTHER PUBLICATIONS

Machine translation of CN-107688245-A retrieved electronically from ESPACENET Sep. 21, 2021 (Year: 2021).*

*Primary Examiner* — Cara E Rakowski
(74) *Attorney, Agent, or Firm* — Muncy, Geissler, Olds & Lowe, P.C.

(57) ABSTRACT

An optical element driving mechanism includes a fixed portion, a movable portion, a moving portion, a first driving assembly and a second driving assembly. The movable portion is movable relative to the fixed portion. The moving portion is connected to an optical element having an optical axis, and is movable relative to the movable portion. The first driving assembly drives the movable portion to move relative to the fixed portion; and the second driving assembly drives the moving portion to move relative to the movable portion.

18 Claims, 11 Drawing Sheets

(56) References Cited

U.S. PATENT DOCUMENTS

2016/0147037 A1\* 5/2016 Arai ................ G02B 7/102
                                                                                                  359/754
2017/0343770 A1\* 11/2017 Eromaki ............. H02K 41/035

\* cited by examiner

OPTICAL ELEMENT DRIVING MECHANISM

CROSS-REFERENCE TO RELATED APPLICATIONS

The present application claims priority to U.S. Provisional Patent Application No. 62/809,891, filed Feb. 25, 2019, and China Patent Applications No. 202020150553.6, filed on Feb. 3, 2020, which are incorporated by reference herein in their entirety.

BACKGROUND OF THE DISCLOSURE

Field of the Disclosure

The present invention relates to a driving mechanism, and more particularly to an optical element driving mechanism.

Description of the Related Art

The design of today's electronic devices is continually moving toward miniaturization, so that various elements or structures of optical modules used in such applications as imaging must be continuously reduced in size to aid in miniaturization. However, in the process of miniaturization, different optical elements, such as macro focus lenses or telephoto lenses, often need to have special designs for different driving mechanisms to correspond.

Therefore, how to design a driving mechanism suitable for multiple optical elements and maintain the thinning of the electronic device has become an important issue.

BRIEF SUMMARY OF THE DISCLOSURE

An embodiment of the invention provides an optical element driving mechanism including a fixed portion, a movable portion, a moving portion, a first driving assembly and a second driving assembly. The movable portion is movable relative to the fixed portion. The moving portion is connected to an optical element having an optical axis, and is movable relative to the movable portion. The first driving assembly drives the movable portion to move relative to the fixed portion, and the second driving assembly drives the moving portion to move relative to the movable portion.

According to some embodiments of the present disclosure, the first driving assembly includes a first driving coil and the second driving assembly includes a second driving coil and a driving magnetic element. The first driving coil, the second driving coil, and the driving magnetic element are disposed in a direction that is perpendicular to the optical axis, and the driving magnetic element is located between the first driving coil and the second driving coil. The first driving coil is disposed on the fixed portion, the second driving coil is disposed on the moving portion, and the driving magnetic element is disposed on the movable portion. The second driving coil is disposed on a side of the moving portion, and the driving magnetic element is disposed on a side of the movable portion. The second driving coil is ring-shaped and is disposed on an outer peripheral surface of the moving portion. The driving magnetic element is disposed at a corner of the movable portion. When viewed in a direction that is perpendicular to the optical axis, the first driving assembly partially overlaps the second driving assembly. The moving portion moves relative to the movable portion in a direction that is parallel to the optical axis, and the movable portion moves relative to the fixed portion in a direction that is parallel to the optical axis.

According to some embodiments of the present disclosure, the optical element driving mechanism further includes a first elastic assembly, which is disposed near a light incident end of the moving portion, and elastically connects the fixed portion, the movable portion and the moving portion, so that the fixed portion, the movable portion and the moving portion move relative to each other. The optical element driving mechanism further includes a second elastic assembly, which is disposed near a light-emitting end of the moving portion, and elastically connects the fixed portion, the movable portion, and the moving portion, so that the fixed portion, the movable portion, and the moving portion move relative to each other. The first elastic assembly is integrated plate-shaped structure, and the second elastic assembly is integrated plate-shaped structure. The first elastic assembly has a first fixed connecting portion connected to the fixed portion, and the second elastic assembly has a second fixed connecting portion connected to the fixed portion, when viewed in a direction that is parallel to the optical axis, the first fixed connecting portion and the second fixed connecting portion do not overlap each other. The first elastic assembly has a first movable connecting portion and a first moving connecting portion, which are respectively connected to the movable portion and the moving portion, and the second elastic assembly has a second movable connecting portion and a second moving connecting portion, which are respectively connected to the movable portion and the moving portion. When viewed in a direction that is parallel to the optical axis, the first movable connecting portion overlaps the second movable connecting portion, and the first moving connecting portion overlaps the second moving connecting portion.

According to some embodiments of the present disclosure, the fixed portion has a first upper limit plane and a first lower limit plane, which restrict a movement of the movable portion in a first movement range. The movable portion has a second upper limit plane and a second lower limit plane, which restrict a movement of the moving portion in a second movement range. When viewed in a direction that is perpendicular to the optical axis, the first upper limit plane and the second upper limit plane do not overlap each other, or the first lower limit plane and the second lower limit plane do not overlap each other. When viewed in a direction that is perpendicular to the optical axis, the first upper limit plane and the second upper limit plane do not overlap each other, and the first lower limit plane and the second lower limit plane do not overlap each other. The moving portion has a limiting portion, which restricts the moving portion to moving within the second movement range. The movable portion has a position-limiting portion, which restricts the movable portion to moving within the first movement range, and the movable portion has a slot restricting the moving portion to move in the second movement range. The slot traverses the movable portion in a direction that is perpendicular to the optical axis. When viewed in a direction that is perpendicular to the optical axis, an upper wall surface in the slot overlaps the second upper limit plane, and a lower wall surface in the slot overlaps the second lower limit plane.

According to some embodiments of the present disclosure, the optical element driving mechanism further includes a third driving assembly, which drives the moving portion and the movable portion to move relative to the fixed portion. A driving direction of the third driving assembly is different from the driving direction of the first driving assembly and the second driving assembly, and the third driving assembly drives the moving portion and the movable portion to move in a direction that is perpendicular to the optical axis. The third driving assembly includes a third driving coil, and the second driving assembly includes a driving magnetic element. The third driving coil is disposed on the fixed portion and near a light-emitting end of the moving portion, when viewed in a direction that is parallel to the optical axis, the third driving coil partially overlaps the driving magnetic element.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

The making and using of the embodiments of an optical module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
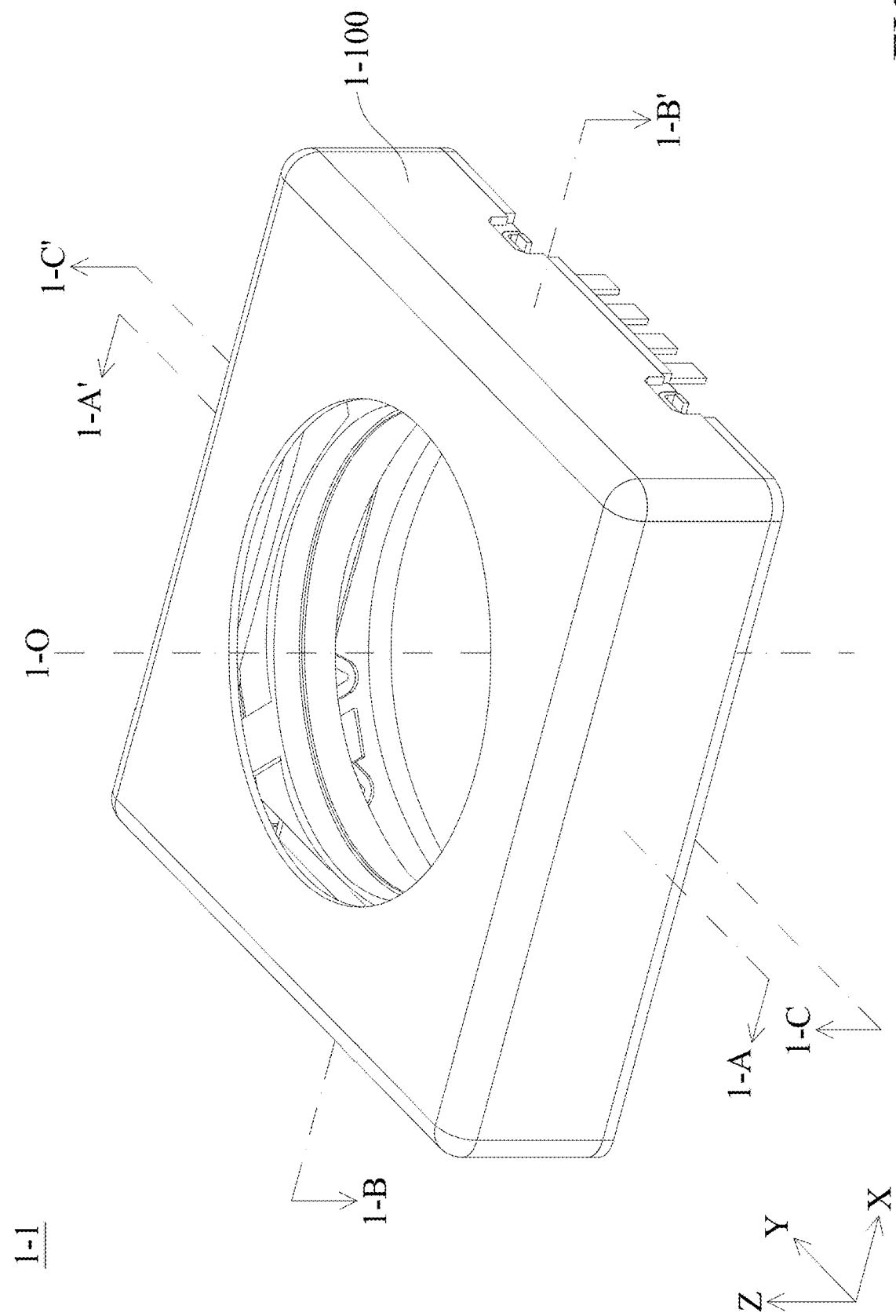
FIG. 1 shows a perspective view of an optical element driving mechanism in accordance with an embodiment of this disclosure.
Figure 2:
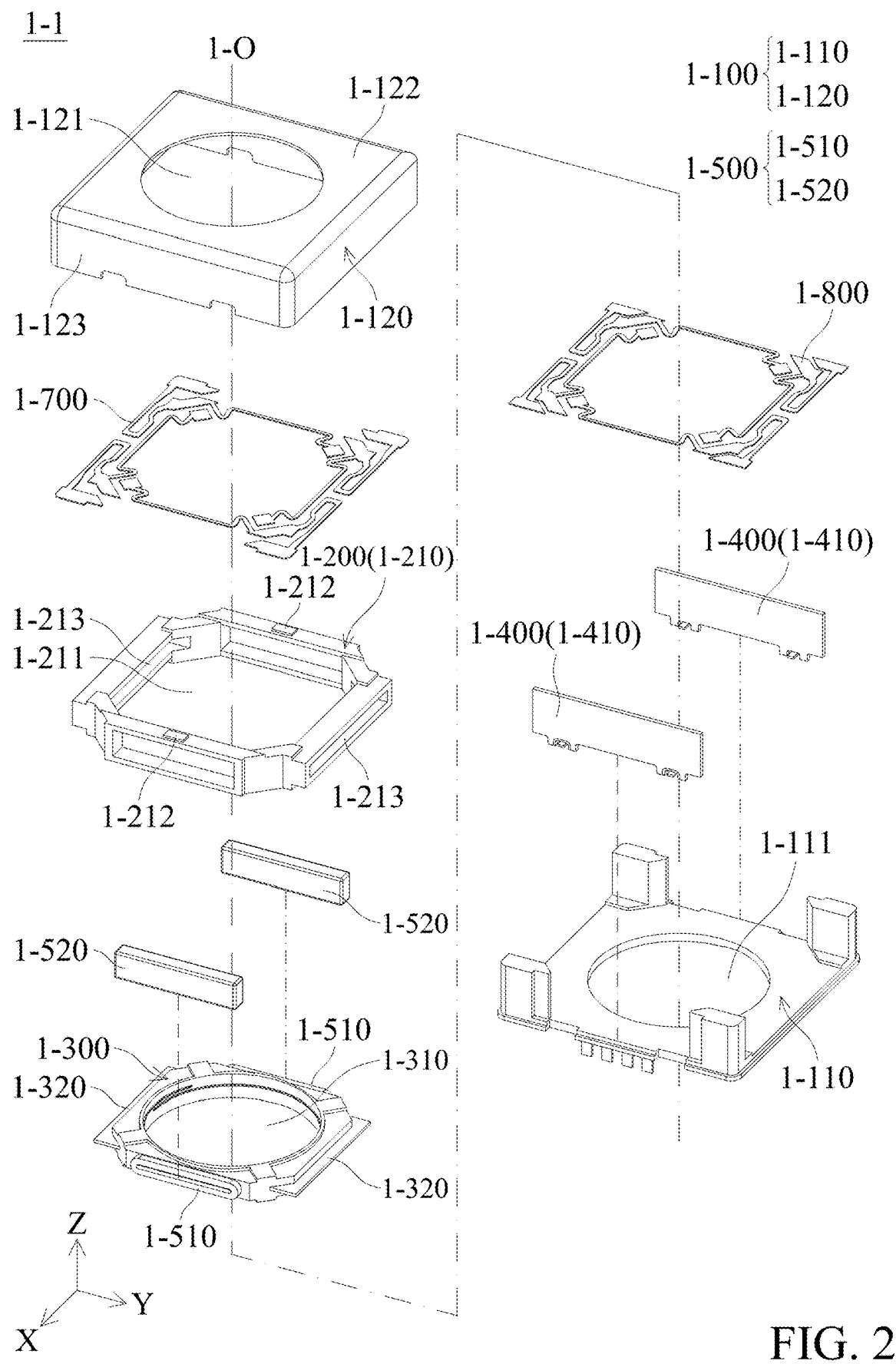
FIG. 2 shows an exploded view of an optical element driving mechanism in accordance with an embodiment of this disclosure.

Refer to FIG. 1 to FIG. 2. FIG. 1 shows a perspective view of an optical element driving mechanism 1-1 in accordance with an embodiment of this disclosure, and FIG. 2 shows an exploded view of the optical element driving mechanism 1-1 in accordance with an embodiment of FIG. 1 of this disclosure. As shown in FIG. 1 and FIG. 2, in the present embodiment, the optical element driving mechanism 1-1 includes a fixed portion 1-100, a movable portion 1-200, a moving portion 1-300, two first driving assembly 1-400, a second driving assembly 1-500, four first elastic assemblies 1-700, and four second elastic assemblies 1-800.

As shown in FIG. 2, the fixed portion 1-100 includes a base 1-110 and a case 1-120. The base 1-110 has a base opening 1-111. The case 1-120 has a case opening 1-121, a top wall 1-122, and four side walls 1-123 extending from edges of the top wall 1-122 along an optical axis 1-O. The case 1-120 and the base 1-110 may be combined to form a housing of the optical element driving mechanism 1-1. It should be understood that the center of the case opening 1-121 corresponds to the optical axis 1-O of an optical element (not shown), and the base opening 1-111 corresponds to an image-sensing element (not shown in the figures) disposed outside the optical element driving mechanism 1-1. External light may enter the case 1-120 through the case opening 1-121, and is received by the image-sensing element after passing through the optical element and the base opening 1-111, so as to generate a digital image signal.

The movable portion 1-200 is movable relative to the fixed portion 1-100, and includes a frame 1-210. The frame 1-210 has a frame opening 1-211, four limiting portions 212, and two slots 1-213. Two of the four limiting portions 212 are disposed on an upper surface of the frame 1-210. The other two limiting portions 212 are disposed on a lower surface of the frame 1-210. Two slots 1-213 are disposed opposite to each other, and the slots 1-213 traverse the movable portion 1-200 in a direction that is perpendicular to the optical axis 1-O. The moving portion 1-300 connects to an optical element (not shown), and moves relative to the movable portion 1-200. For example, the moving portion 1-300 may be a holder which holds a lens. The moving portion 1-300 has a through hole 1-310 and two limiting portions 1-320. The two limiting portions 1-320 are disposed opposite to each other. The limiting portion 1-320 can be an iron piece, which is inserted into the moving portion 1-300 through the slot 1-213. However, the material of the limiting portion 1-320 is not limited to iron, plastic or other suitable materials may also be used.

Figure 3:
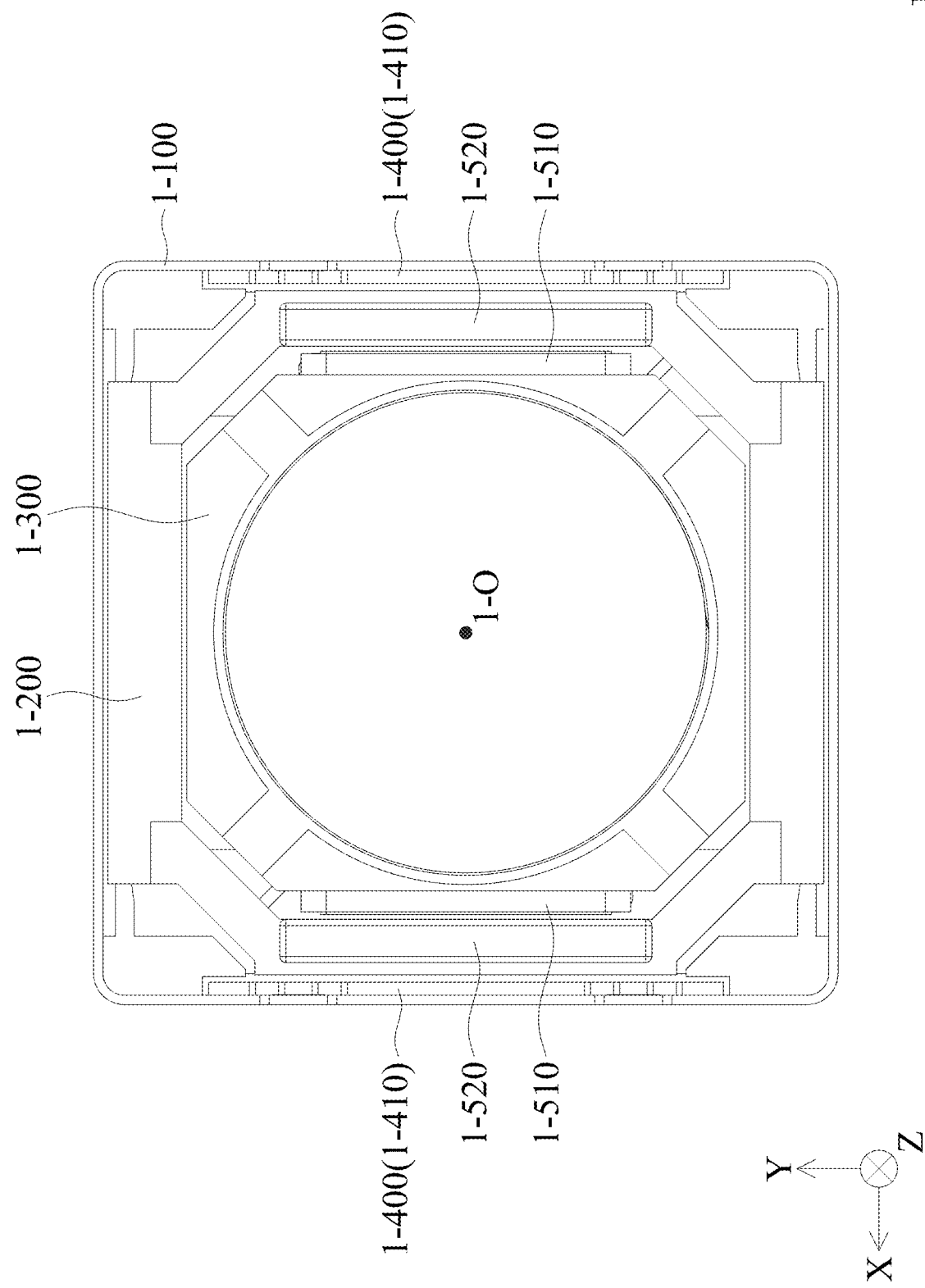
FIG. 3 shows a cross-sectional view of an optical element driving mechanism along a line 1-A-1-A' in FIG. 1.

Refer to FIG. 3. FIG. 3 shows a cross-sectional view of an optical element driving mechanism along a line 1-A-1-A' in FIG. 1. The first driving assembly 1-400 drives the movable portion 1-200 to move relative to the fixed portion 1-100. The first driving assembly 1-400 includes two first driving coils 1-410. The second driving assembly 1-500 drives the moving portion 1-300 to move relative to the movable portion 1-200. The second driving assembly 1-500 includes two second driving coils 1-510 and two driving magnetic elements 1-520. As shown in FIG. 3, the first driving coil 1-410, the second driving coil 1-510, and the driving magnetic element 1-520 are disposed in a direction that is perpendicular to the optical axis 1-O, and the driving magnetic element 1-520 is located between the first driving coil 1-410 and the second driving coil 1-510. When viewed in a direction that is perpendicular to the optical axis 1-O, the first driving assembly 1-400 partially overlaps the second driving assembly 1-500.

The first driving coil 1-410 is disposed on the fixed portion 1-100. The first driving coil 1-410 may be, for example, a printed circuit board, and a driving coil is disposed inside. The first driving coil 1-410 correspond to the position of the driving magnetic element 1-520, and the first driving coil 1-410 may be fixed on the base 1-110 by an adhesive method.

The second driving coil 1-510 is disposed on the moving portion 1-300. In this embodiment, the second driving coil 1-510 is disposed on a side of the moving portion 1-300, more specifically, two second driving coils 1-510 are disposed on two sides of the moving portion 1-300 and opposite to each other. The two sides are the sides without the limiting portions 1-320.

The driving magnetic element 1-520 is disposed on the movable portion 1-200. In this embodiment, the driving magnetic element 1-520 is disposed on a side of the movable portion 1-200. More specifically, two driving magnetic elements 1-520 may be two rectangular magnets, which are disposed on two sides of the frame 1-210 and opposite to each other. The two sides are the sides without the slots 1-213.

Figure 4:
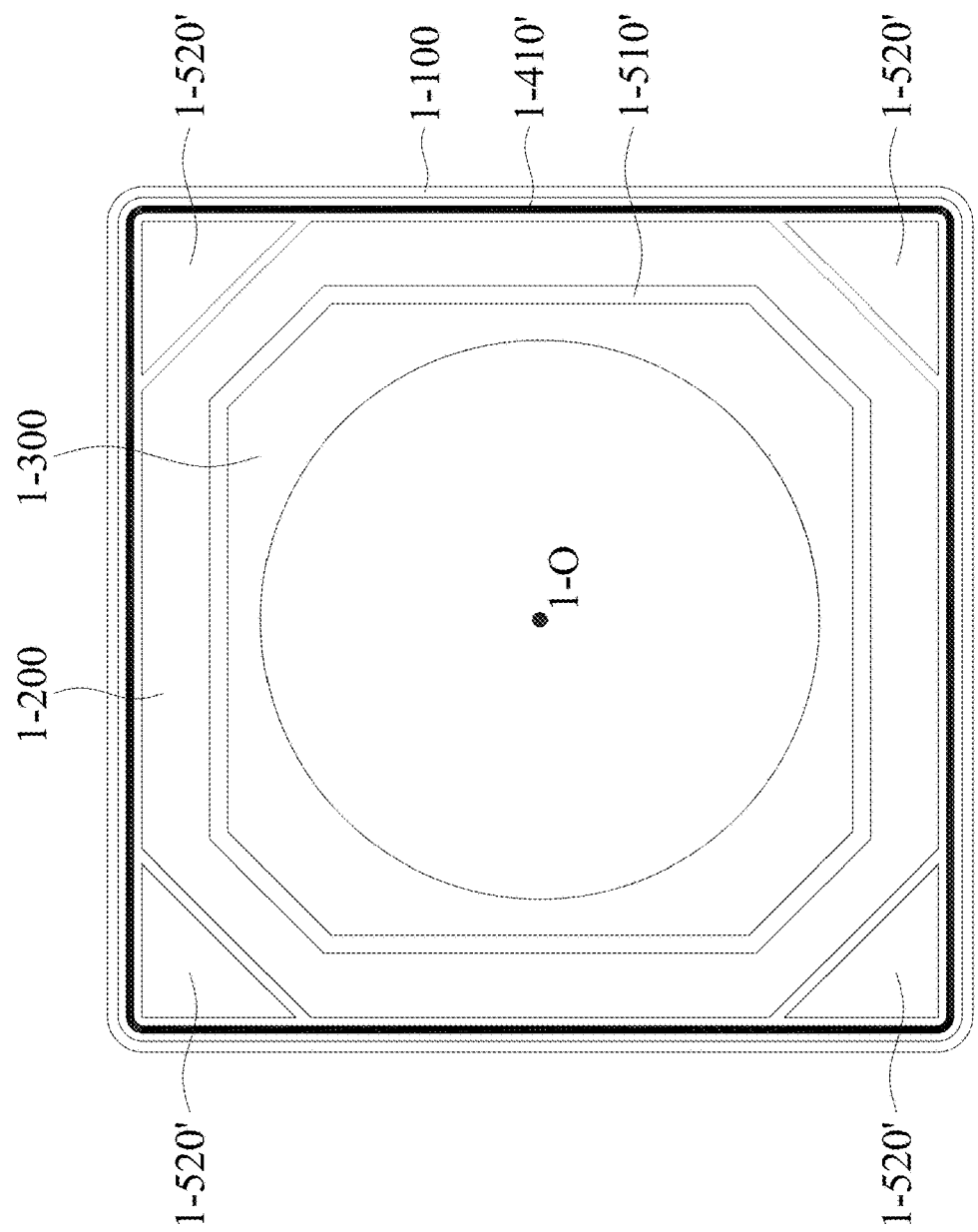
FIG. 4 shows a partial structure diagram of an optical element driving mechanism in accordance with an embodiment of this disclosure.

However, the shape, size, and arrangement of the driving magnetic element 1-520, the first driving coil 1-410, and the second driving coil 1-510 are not limited to those embodiments mentioned above. Refer to FIG. 4. FIG. 4 shows a partial structure diagram of an optical element driving mechanism in accordance with an embodiment of this disclosure. In this embodiment, a first driving coil 1-410' is disposed on the outside of the movable portion 1-200 and the driving magnetic element 1-520'. The second driving coil 1-510' is ring-shaped and is disposed on the outer peripheral surface of the moving portion 1-300. In other words, the second driving coil 1-510' is wound on the outer peripheral surface of the moving portion 1-300, and the driving magnetic element 1-520' is disposed at a corner of the movable portion 1-200.

Figure 5:
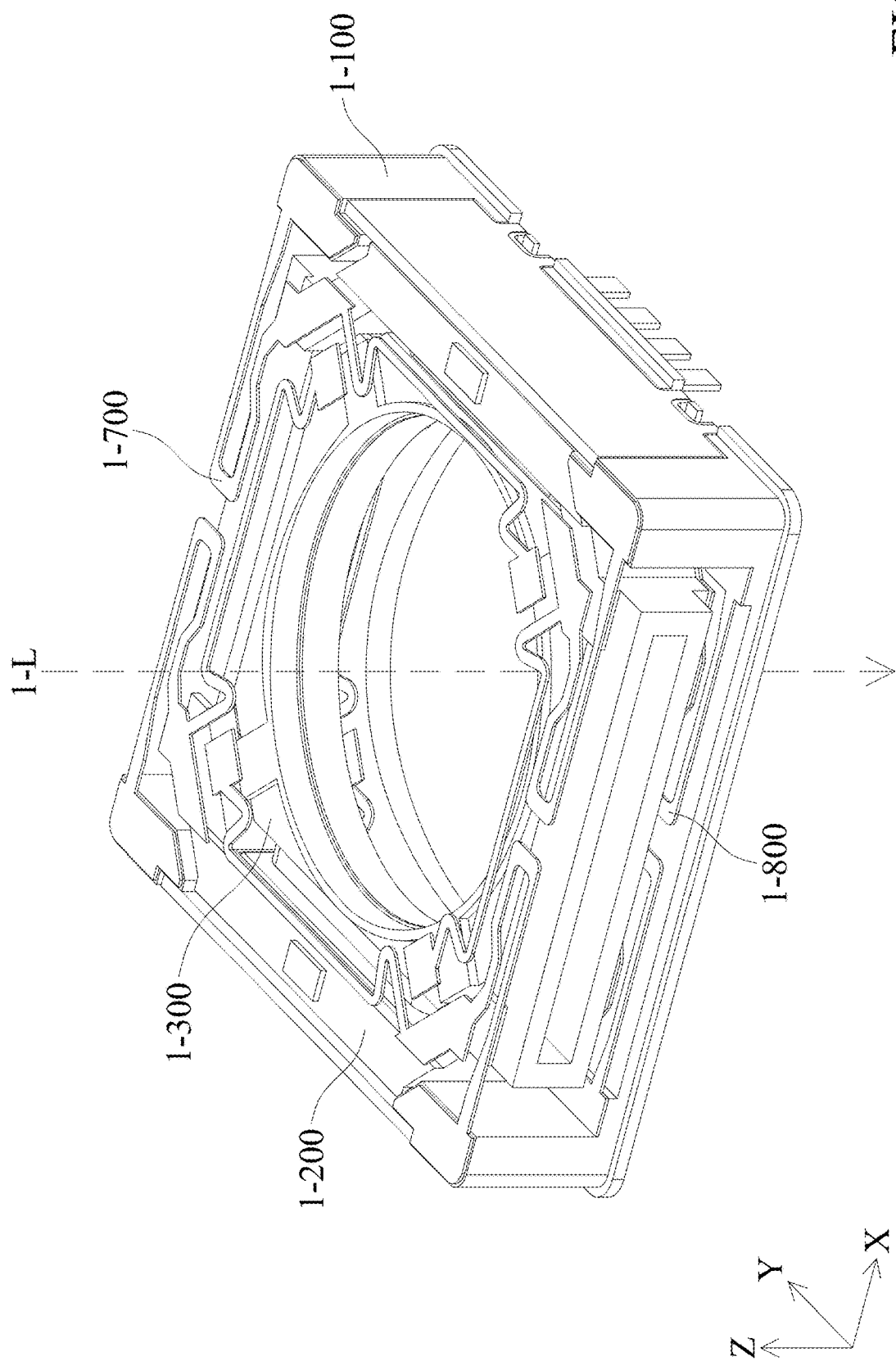
FIG. 5 shows a partial structure diagram of an optical element driving mechanism in accordance with an embodiment of this disclosure.
Figure 6:
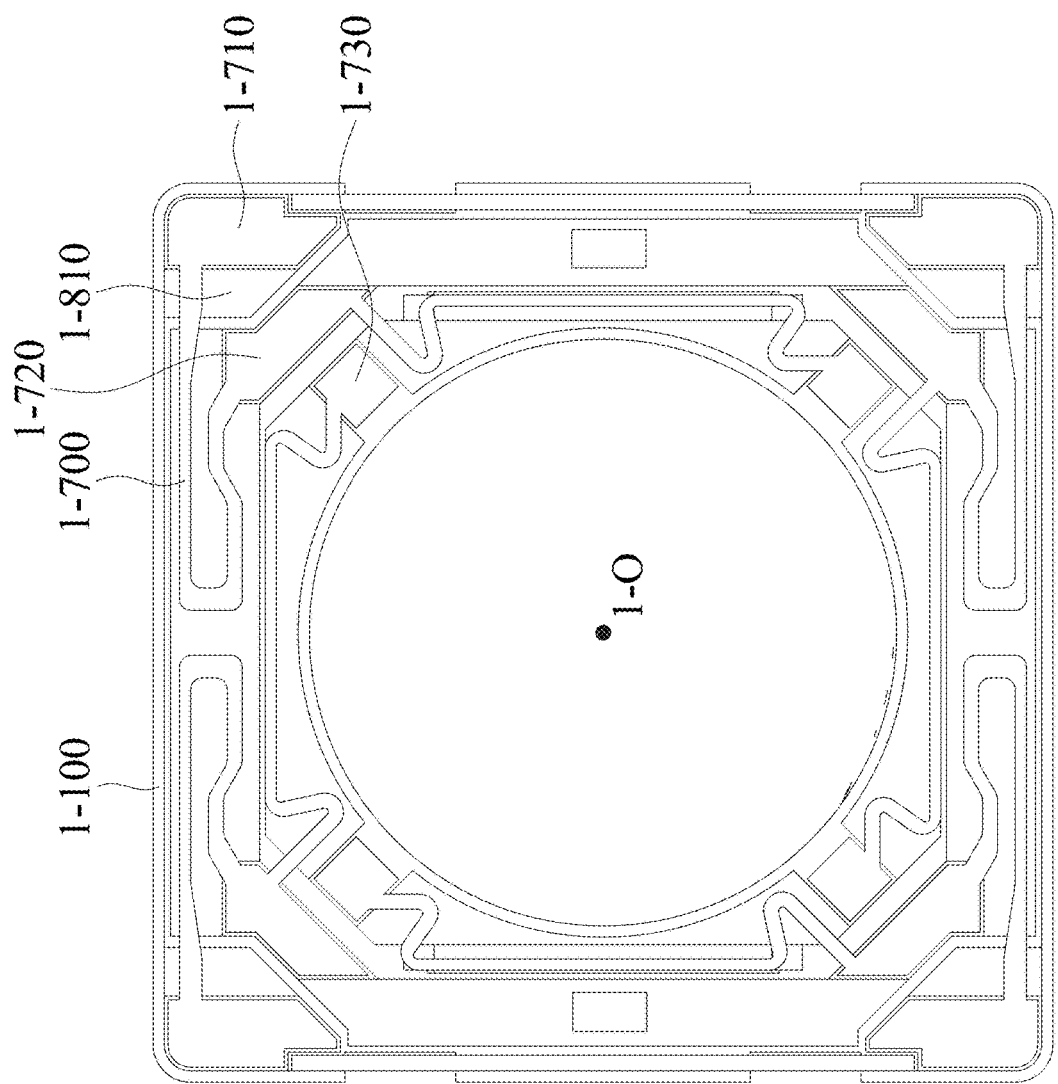
FIG. 6 shows a top view of a partial structure of an optical element driving mechanism of FIG. 1.
Figure 7:
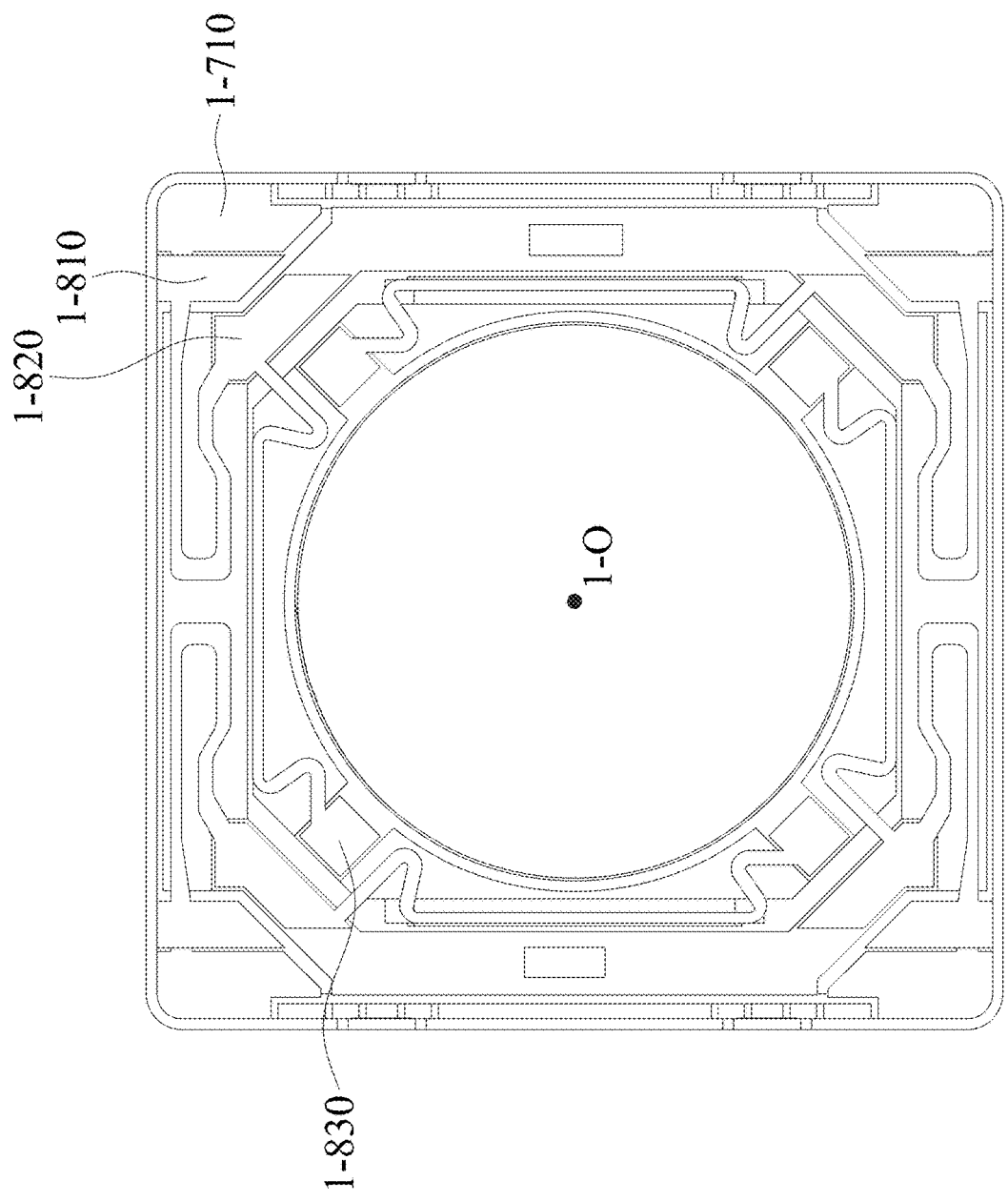
FIG. 7 shows bottom view of a partial structure of an optical element driving mechanism of FIG. 1.

Refer to FIG. 5 to FIG. 7. FIG. 5 shows a partial structure diagram of an optical element driving mechanism in accordance with an embodiment of this disclosure. FIG. 6 shows a top view of a partial structure of an optical element driving mechanism of FIG. 1. FIG. 7 shows bottom view of a partial structure of an optical element driving mechanism of FIG. 1. As shown in FIG. 5, the first elastic assembly 1-700 is integrated plate-shaped structure and the second elastic assembly 1-800 is integrated plate-shaped structure. Four first elastic assemblies 1-700 are disposed on a side of the moving portion 1-300 near a light incident end of a incident light 1-L, and elastically connected to the fixed portion 1-100, the movable portion 1-200, and the moving portion 1-300. More specifically, as shown in FIG. 5 and FIG. 6, the first elastic assembly 1-700 has a first fixed connecting portion 1-710, which is connected to the base 1-110. The first elastic assembly 1-700 has a first movable connecting portion 1-720 and a first moving connecting portion 1-730, which are connected to the movable portion 1-200 and the moving portion 1-300, respectively.

Similarly, four second elastic assemblies 1-800 are disposed on a side of the moving portion 1-300 near a light-emitting end of the incident light 1-L, and elastically connect the fixed portion 1-100, the movable portion 1-200, and the moving portion 1-300. More specifically, as shown in FIG. 7, the second elastic assembly 1-800 has a second fixed connecting portion 1-810, which is connected to the base 1-110. The second elastic assembly 1-800 has a second movable connecting portion 1-820 and a second moving connecting portion 1-830, which are connected to the movable portion 1-200 and the moving portion 1-300, respectively. By the connection of first elastic assembly 1-700 and the second elastic assembly 1-800 described above, the fixed portion 1-100, the movable portion 1-200, and the moving portion 1-300 may move relative to each other.

Figure 8:
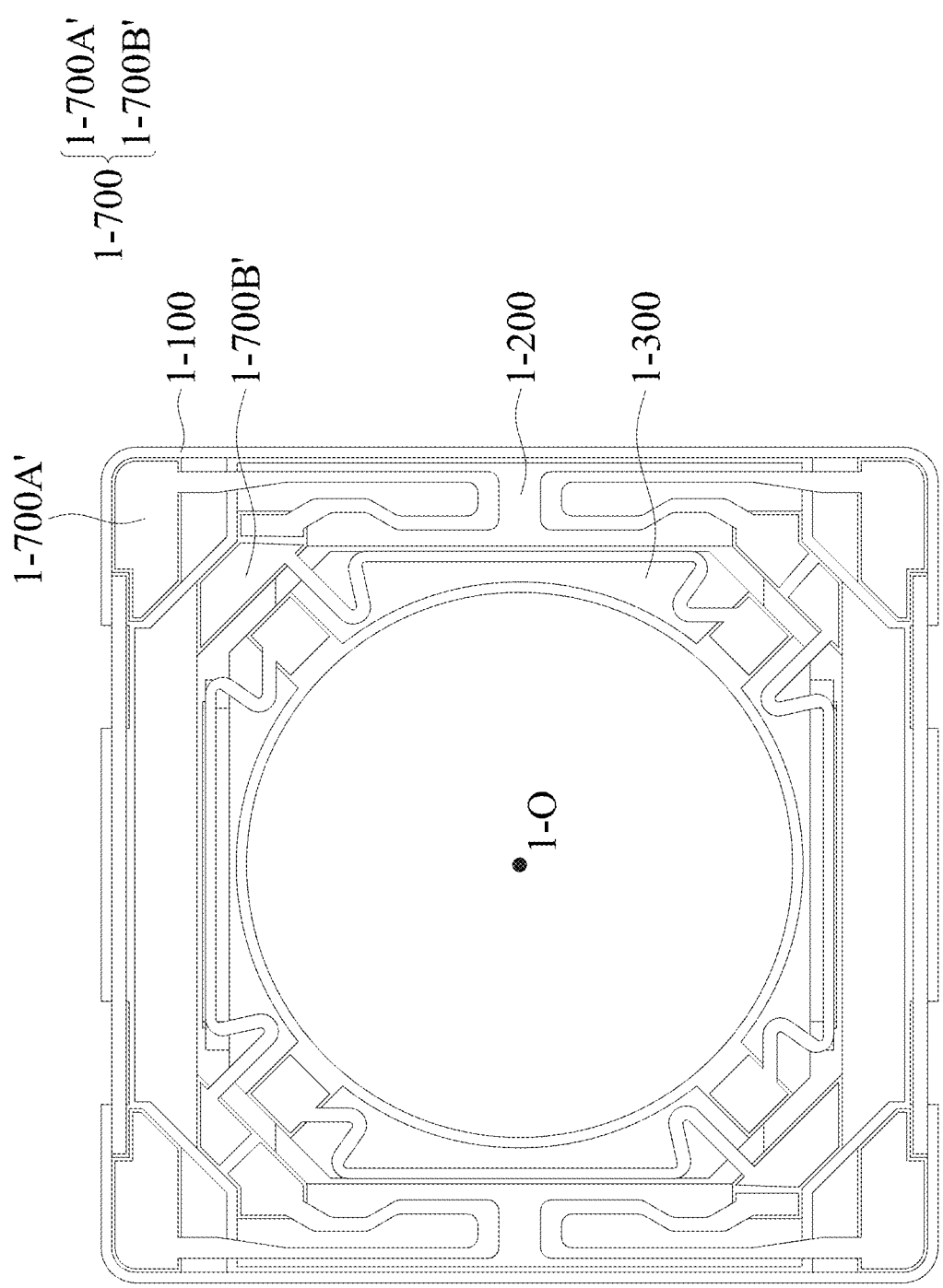
FIG. 8 shows a partial structure diagram of an optical element driving mechanism in accordance with an embodiment of this disclosure.

As shown in FIG. 6 and FIG. 7, when viewed in a direction that is parallel to the optical axis 1-O, the first fixed connecting portion 1-710 and the second fixed connecting portion 1-810 do not overlap each other. The first movable connecting portion 1-720 and the second movable connecting portion 1-820 overlap each other, and the first moving connecting portion 1-730 and the second moving connecting portion 1-830 overlap each other. In other words, the first elastic assembly 1-700 and the second elastic assembly 1-800 have approximately the same shape, but the shape and length can be changed as required. Further, in this embodiment, the integrated plate-shaped structure of the first elastic assembly 1-700 and the second elastic assembly 1-800 can reduce production costs, but the present invention is not limited to this. As shown in FIG. 8, FIG. 8 shows a partial structure diagram of an optical element driving mechanism in accordance with an embodiment of this disclosure. The first elastic assembly 1-700' is not integrated, but is formed by an elastic assembly 700'A connecting movable portion 1-200 and a fixed portion 1-100 and an elastic assembly 700'B connecting the movable portion 1-200 and the moving portion 1-300.

As described above, the moving portion 1-300 is movably disposed in the movable portion 1-200 and the movable portion 1-200 is movably disposed in the fixed portion 1-100 by the first elastic assembly 1-700 and the second elastic assembly 1-800. More specifically, the moving portion 1-300 may be suspended in the frame 1-210 by the first elastic assembly 1-700 and the second elastic assembly 1-800, and the frame 1-210 may be suspended in the case 1-120 by the first elastic assembly 1-700 and the second elastic assembly 1-800. When a current is applied to the first driving coil 1-410 disposed on the fixed portion 1-100, the first driving coil may act with the magnetic field of the driving magnetic element 1-520 disposed on the movable portion 1-200 to generate an electromagnetic force, so that the frame 1-210 connected by the first movable connecting portion 1-720 of the first elastic assembly 1-700 and the second movable connecting portion 1-820 of the second elastic assembly 1-800 is driven to move relative to the case 1-120 in a direction that is parallel to the optical axis 1-O. That is, a driving method of moving the magnetic element in which the magnetic element moves relative to the driving coil.

On the other hand, when a current is applied to the second driving coil 1-510 disposed on the moving portion 1-300, the second driving coil 1-510 may act with the magnetic field of the driving magnetic element 1-520 disposed on the movable portion 1-200 to generate an electromagnetic force, so that the moving portion 1-300 connected by the first moving connecting portion 1-730 of the first elastic assembly 1-700 and the second moving connecting portion 1-830 of the second elastic assembly 1-800 is driven to move relative to the frame 1-210 in a direction that is parallel to the optical axis 1-O. That is, a driving method of moving the driving coil in which the driving coil moves relative to the magnetic element.

In the conventional optical element driving mechanism, the frame is fixed and immovable, and the movement of the optical element is controlled by an elastic assembly connected to a moving portion, which is a one-step movement. In contrast, in the present embodiment, the first elastic assembly 1-700 and the second elastic assembly 1-800 (referred to as the elastic assembly below) control the movement of the movable portion 1-200 relative to the fixed portion 1-100 and the movement of the moving portion 1-300 relative to the movable portion 1-200. The optical element may be moved in two steps by the elastic assembly.

Figure 9:
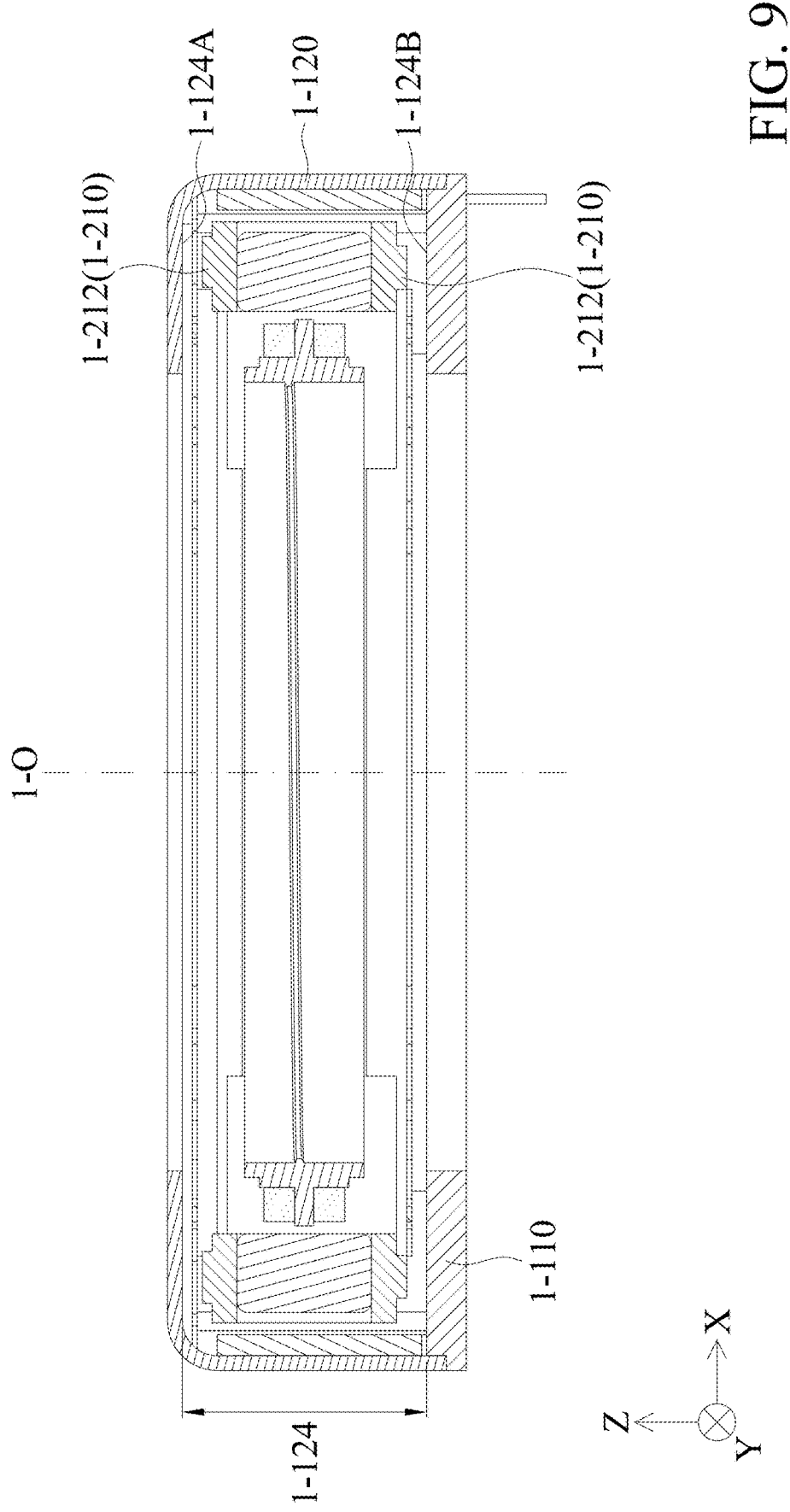
FIG. 9 shows a cross-sectional view of an optical element driving mechanism along a line 1-B-1-B' in FIG. 1.
Figure 10:
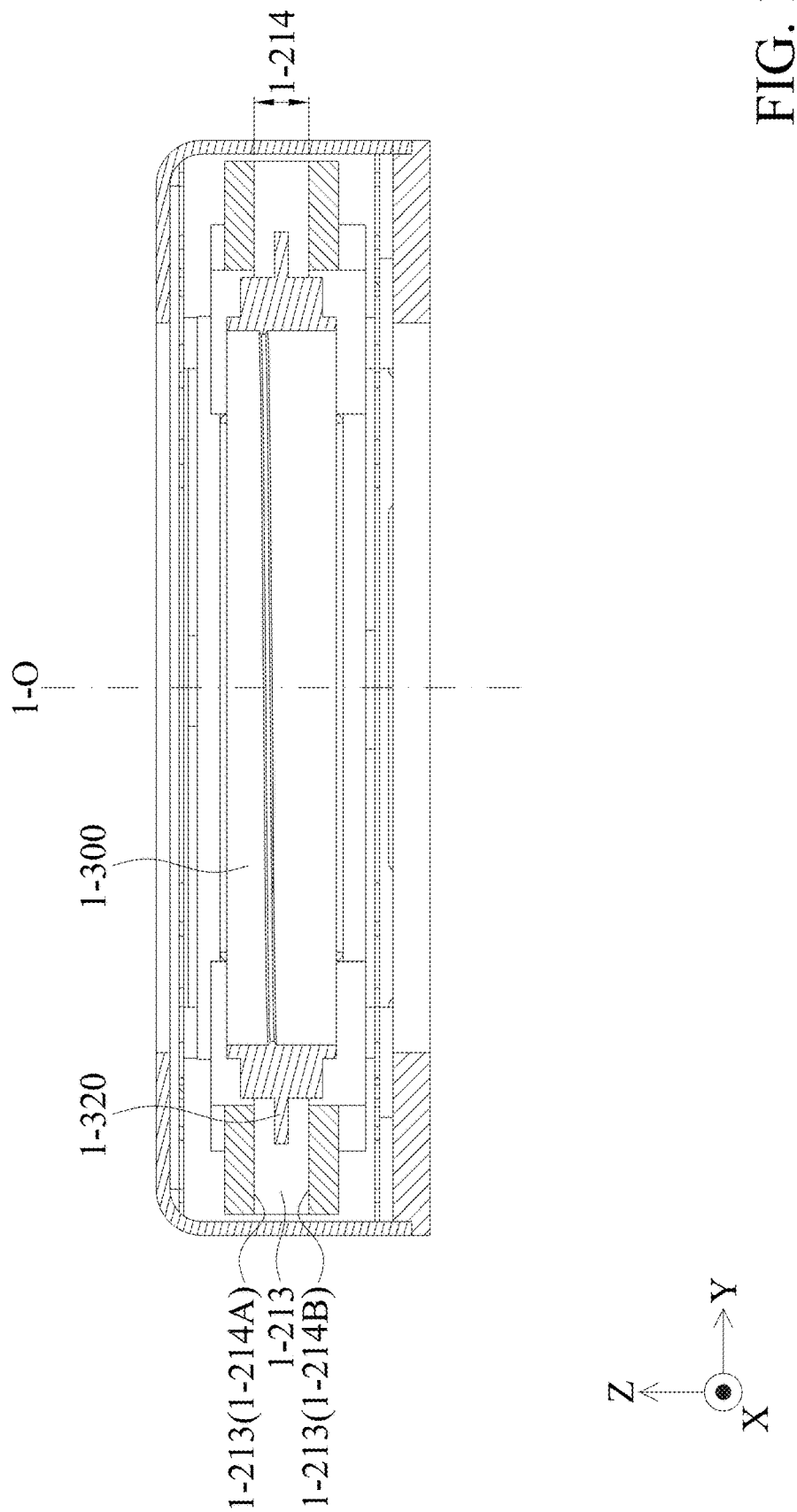
FIG. 10 shows a cross-sectional view of an optical element driving mechanism along a line 1-C-1-C' in FIG. 1.

In addition, in this embodiment, the movement of the optical element may be controlled within a certain range. The following description is made with reference to FIG. 9 to FIG. 10. FIG. 9 shows a cross-sectional view of an optical element driving mechanism along a line 1-B-1-B' in FIG. 1. FIG. 10 shows a cross-sectional view of an optical element driving mechanism along a line 1-C-1-C' in FIG. 1. As shown in FIG. 9, the fixed portion 1-100 has a first upper limit plane 1-124A and a first lower limit plane 1-124B, and the first upper limit plane 1-124A and the first lower limit plane 1-124B restrict the movement of the movable portion 1-200 in a first movement range 1-124, more specifically, an inner wall surface of the case 1-120 of the fixed portion 1-100 constitutes a first upper limit plane 1-124A, and an upper surface of the base 1-110 constitutes a first lower limit plane 1-124B. The upper surface and lower surface of the frame 1-210 of the movable portion 1-200 respectively has a position-limiting portion 1-212 which is convex. When the frame 1-210 is driven to move in a direction that is parallel to the optical axis 1-O, the frame 1-210 stops when the position-limiting portion 1-212 touches the first upper limit plane 1-124A or the first lower limit plane 1-124B. Thus the movement of the frame 1-210 is restricted in the first movement range 1-124. However, the position-limiting portion 1-212 is not limited to this structure, and its shape, height, and position can be changed as required. For example, the position-limiting portion 1-212 can be disposed on an upper surface of the base 1-110 of the fixed portion 1-100 and an inner wall surface of the case 1-120.

Refer to FIG. 10, the movable portion 1-200 has a second upper limit plane 1-214A and a second lower limit plane 1-214B, and restricts the movement of the moving portion 1-300 in a second movement range 1-214. More specifically, an upper wall surface 1-213A and a lower wall surface 1-213B in the slot 1-213 of the movable portion 1-200 constitute a second upper limit plane 1-214A and a second lower limit plane 1-214B. The movement of the moving portion 1-300 is restricted in the second movement range 1-214, and the liming portion 1-320 of the moving portion 1-300 is located within the second movement range 1-214, that is, when the moving portion 1-300 is driven to move in a direction that is parallel to the optical axis 1-O, the moving portion 1-300 stops when the limiting portion 1-320 touches the second upper limit plane 1-214A or the second lower limit plane 1-214B. Thus, the movement of the movable portion 1-300 is restricted in the second movement range 1-214.

The positions of the first upper and lower limiting planes and the second upper and lower limiting planes may be disposed according to requirements, and are not limited. For example, in an embodiment, when viewed in a direction that is perpendicular to the optical axis 1-O, the first upper limit plane 1-124A and the second upper limit plane 1-214A do not overlap each other, or the first lower limit plane 1-124B and the second lower limit plane 1-214B do not overlap each other. In another embodiment, when viewed in a direction that is perpendicular to the optical axis 1-0, the first upper limit plane 1-124A and the second upper limit plane 1-214A do not overlap each other, and the first lower limit plane 1-124B and the second lower limit plane 1-214B do not overlap each other.

Compared with the conventional optical element driving mechanism, in this embodiment, as can be seen from the above, the two-step movement of the elastic assembly and the setting of the movement range of the movable portion 1-200 and the moving portion 1-300 may solve the problem of the elastic assembly being easy to break due to large movements. For example, a conventional elastic assembly of a conventional optical element driving mechanism may only stretch in one step to move an optical element held by a moving portion to achieve a movement of, for example, 300 micrometers. In contrast, in this embodiment, the moving connecting portion (the first moving connecting portion 1-730 and the second moving connecting portion 1-830) of the elastic assembly moves the moving portion 1-300 by 150 micrometers, and the movable connecting portion (the first movable connecting portion 1-720 and the second movable connecting portion 1-820) moves the movable portion 1-200 by 150 micrometers to achieve the movement of 300 micrometers. With two-step stretching, the range that each portion of the elastic assembly needs to stretch will be shorter, and therefore it is less likely to break than with conventional one-step stretching.

In addition, the overall relative moving range of the optical element in this embodiment may also be larger. For example, in the conventional optical element driving mechanism, the optical element held by the moving portion 1-300 may only move by +300 micrometers or −300 micrometers in a direction that is parallel to the optical axis 1-O due to the stretching limit of the elastic assembly. However, in this embodiment, in addition to the ±300 micrometers in which the moving portion 1-300 can move, the frame 1-210 can be moved, for example, ±300 microns, so the overall relative moving range is larger.

In addition, since the overall relative moving range of the optical element in this embodiment is larger, the optical element driving mechanism 1-1 may offer a greater range of focal length when applying in a zoom lens. Therefore, it can achieve a shorter or longer distance focusing. In addition, the one-step stretching elastic assembly of the conventional optical element driving mechanism may be designed longer to achieve the same range of focal length. However, in addition to the breakage problem mentioned above, this design also has a problem with the overall rigidity of the elastic assembly being difficult to control because the elastic assembly is too long, further causing a problem with the position of the optical element being hard to control. In comparison, in this embodiment, same range of focal length can be achieved without the need to use a longer elastic assembly, as the conventional elastic assembly does. In addition, the position of the optical element may be controlled more precisely because the elastic assembly is shorter.

Figure 11:
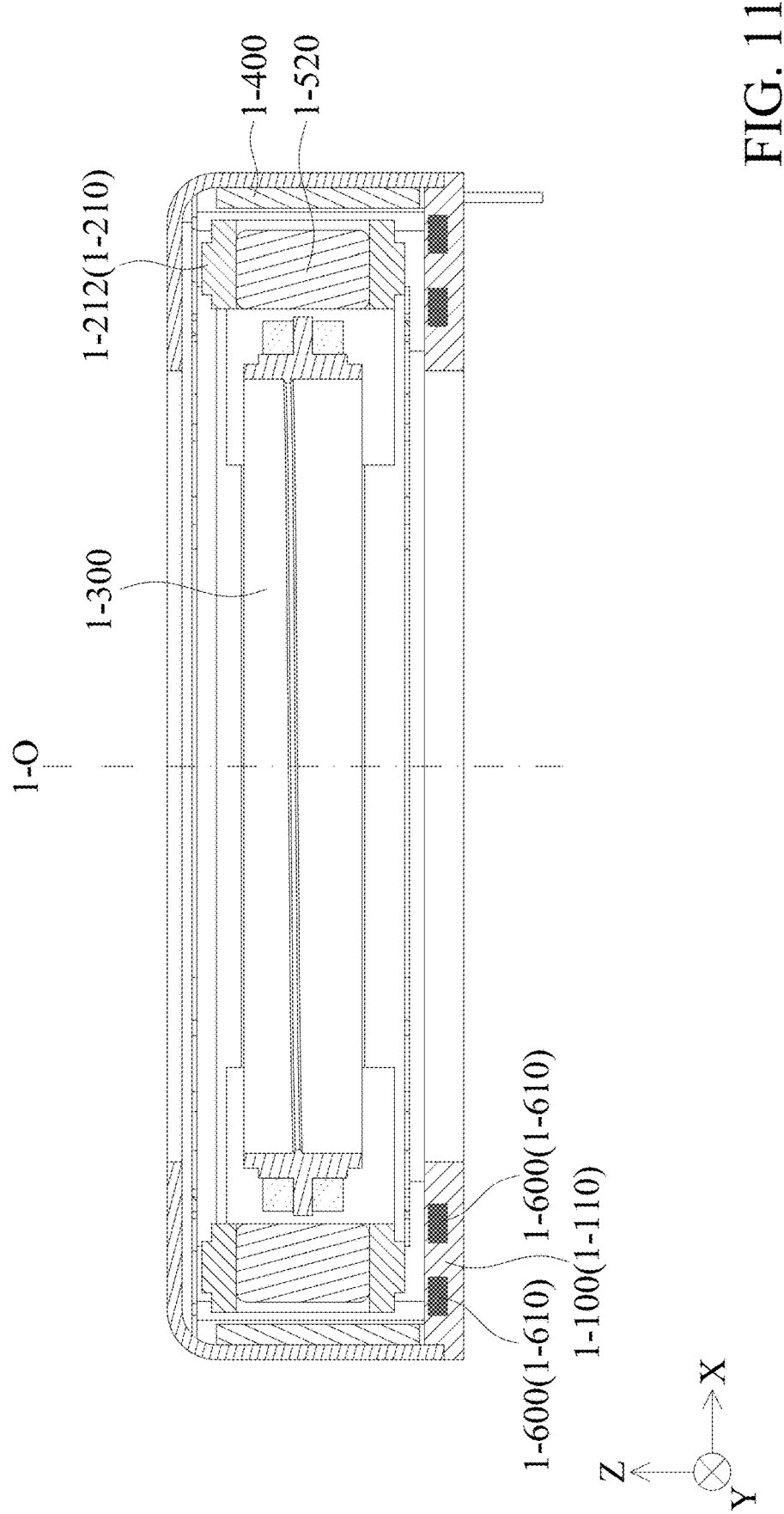
FIG. 11 shows a partial structure diagram of an optical element driving mechanism in accordance with an embodiment of this disclosure.

Refer to FIG. 11. FIG. 11 shows a partial structure diagram of an optical element driving mechanism in accordance with an embodiment of this disclosure. In order to control the optical element more precisely, a third driving assembly 1-600 may be disposed on the fixed portion 1-100 and close to a light-emitting end of the moving portion 1-300. The third driving assembly 1-600 may drive the moving portion 1-300 and the movable portion 1-200 to move relative to the fixed portion 1-100. More specifically, a third driving assembly 1-600 may be disposed on the base 1-110. The third driving assembly 1-600 includes a third driving coils 1-610 embedded in the base 1-110. When viewed in a direction that is parallel to the optical axis 1-O, the third driving coil 1-610 partially overlaps the driving magnetic element 1-520.

Further, the driving direction of the third driving assembly 1-600 is different from that of the first driving assembly 1-400 and the second driving assembly 1-500. The third driving assembly 1-600 drives the moving portion 1-300 and the movable portion 1-200 to move in a direction that is perpendicular to the optical axis 1-O. For example, position sensing elements (not shown), such as Hall effect sensor, magnetoresistive sensor (MR sensor), or magnetic flux sensor (Fluxgate), etc., are respectively installed on different sides of the base 1-110, which can be used to sense the driving magnetic elements 1-520 on the frame 1-210 to know the position offsets of the frame 1-210 and the moving portion 1-300 with respect to the base 1-110 in the X direction and the Y direction. Next, the electric signal is provided to the third driving coil 1-610, and the electromagnetic force generated between the third driving coil 1-610 and the driving magnetic element 1-520 on the frame 1-210 is used to drive the frame 1-210 to move in a direction that is perpendicular to the optical axis 1-O (parallel to the XY plane) to compensate the position offsets mentioned above. In addition to more accurate control of the optical element, the optical image stabilization (OIS) function is further realized.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism comprising:
a fixed portion;
a movable portion, which is movable relative to the fixed portion;
a moving portion, connected to an optical element having an optical axis, and movable relative to the movable portion;
a first driving assembly, comprising a first driving coil, driving the movable portion to move relative to the fixed portion;
a second driving assembly, comprising a second driving coil and a driving magnetic element, driving the moving portion to move relative to the movable portion;
wherein the moving portion moves relative to the movable portion in a direction that is parallel to the optical axis, and the movable portion moves relative to the fixed portion in a direction that is parallel to the optical axis;
wherein the first driving coil is disposed on the fixed portion, the second driving coil is disposed on the moving portion, and the driving magnetic element is disposed on the movable portion.

2. The optical element driving mechanism as claimed in claim 1, wherein the first driving coil, the second driving coil, and the driving magnetic element are disposed in a direction that is perpendicular to the optical axis, and the driving magnetic element is located between the first driving coil and the second driving coil.

3. The optical element driving mechanism as claimed in claim 1, wherein the second driving coil is disposed on a side of the moving portion, and the driving magnetic element is disposed on a side of the movable portion.

4. The optical element driving mechanism as claimed in claim 1, wherein the second driving coil is ring-shaped and is disposed on an outer peripheral surface of the moving portion, and the driving magnetic element is disposed at a corner of the movable portion.

5. The optical element driving mechanism as claimed in claim 1, wherein when viewed in a direction that is perpendicular to the optical axis, the first driving assembly partially overlaps the second driving assembly.

6. The optical element driving mechanism as claimed in claim 1, further comprising a first elastic assembly, which is disposed near a light incident end of the moving portion, and elastically connects the fixed portion, the movable portion and the moving portion, so that the fixed portion, the movable portion and the moving portion move relative to each other.

7. The optical element driving mechanism as claimed in claim 6, further comprising a second elastic assembly, which is disposed near a light-emitting end of the moving portion, and elastically connects the fixed portion, the movable portion, and the moving portion, so that the fixed portion, the movable portion, and the moving portion move relative to each other.

8. The optical element driving mechanism as claimed in claim 7, wherein the first elastic assembly is an integrated plate-shaped structure and the second elastic assembly is an integrated plate-shaped structure.

9. The optical element driving mechanism as claimed in claim 7, wherein the first elastic assembly has a first movable connecting portion and a first moving connecting portion, which are respectively connected to the movable portion and the moving portion, and the second elastic assembly has a second movable connecting portion and a second moving connecting portion, which are respectively connected to the movable portion and the moving portion, and when viewed in a direction that is parallel to the optical axis, the first movable connecting portion overlaps the second movable connecting portion, and the first moving connecting portion overlaps the second moving connecting portion.

10. An optical element driving mechanism comprising:
a fixed portion;
a movable portion, which is movable relative to the fixed portion;
a moving portion, connected to an optical element having an optical axis, and movable relative to the movable portion;
a first driving assembly, driving the movable portion to move relative to the fixed portion;
a second driving assembly, driving the moving portion to move relative to the movable portion;
a first elastic assembly, disposed near a light incident end of the moving portion, elastically connecting the fixed portion, the movable portion and the moving portion, so that the fixed portion, the movable portion and the moving portion move relative to each other; and
a second elastic assembly, disposed near a light-emitting end of the moving portion, elastically connecting the fixed portion, the movable portion, and the moving portion, so that the fixed portion, the movable portion, and the moving portion move relative to each other;
wherein the first elastic assembly has a first fixed connecting portion connected to the fixed portion, and the second elastic assembly has a second fixed connecting portion connected to the fixed portion, and when viewed in a direction that is parallel to the optical axis, the first fixed connecting portion and the second fixed connecting portion do not overlap each other.

11. An optical element driving mechanism comprising:
a fixed portion;
a movable portion, which is movable relative to the fixed portion;
a moving portion, connected to an optical element having an optical axis, and movable relative to the movable portion;
a first driving assembly, driving the movable portion to move relative to the fixed portion;
a second driving assembly, driving the moving portion to move relative to the movable portion;
wherein the fixed portion has a first upper limit plane and a first lower limit plane, which restrict a movement of the movable portion in a first movement range, and the movable portion has a second upper limit plane and a second lower limit plane, which restrict a movement of the moving portion in a second movement range, and when viewed in a direction that is perpendicular to the optical axis, the first upper limit plane and the second upper limit plane do not overlap each other, or the first lower limit plane and the second lower limit plane do not overlap each other.

12. The optical element driving mechanism as claimed in claim 11, wherein when viewed in a direction that is perpendicular to the optical axis, the first upper limit plane and the second upper limit plane do not overlap each other, and the first lower limit plane and the second lower limit plane do not overlap each other.

13. The optical element driving mechanism as claimed in claim 11, wherein the moving portion has a limiting portion, which restricts the moving portion to moving within the second movement range.

14. The optical element driving mechanism as claimed in claim 11, wherein the movable portion has a position-limiting portion, which restricts the movable portion to moving within the first movement range, and the movable portion has a slot restricting the moving portion to moving within the second movement range.

15. The optical element driving mechanism as claimed in claim 14, wherein the slot traverses the movable portion in a direction that is perpendicular to the optical axis, and when viewed in a direction that is perpendicular to the optical axis, an upper wall surface in the slot overlaps the second upper limit plane, and a lower wall surface in the slot overlaps the second lower limit plane.

16. An optical element driving mechanism comprising:
a fixed portion;
a movable portion, which is movable relative to the fixed portion;
a moving portion, connected to an optical element having an optical axis, and movable relative to the movable portion;
a first driving assembly, driving the movable portion to move relative to the fixed portion;
a second driving assembly, driving the moving portion to move relative to the movable portion; and
a third driving assembly, which drives the moving portion and the movable portion to move relative to the fixed portion.

17. The optical element driving mechanism as claimed in claim 16, wherein a driving direction of the third driving assembly is different from the driving direction of the first driving assembly and the second driving assembly, and the third driving assembly drives the moving portion and the movable portion to move in a direction that is perpendicular to the optical axis.

18. The optical element driving mechanism as claimed in claim 17, wherein the third driving assembly comprises a third driving coil, and the second driving assembly comprises a driving magnetic element, and the third driving coil is disposed on the fixed portion and near a light-emitting end of the moving portion, and when viewed in a direction that is parallel to the optical axis, the third driving coil partially overlaps the driving magnetic element.

\* \* \* \* \*